United States Patent
Matthews

(10) Patent No.: US 7,489,120 B2
(45) Date of Patent: Feb. 10, 2009

(54) METHOD AND APPARATUS FOR A HIGH VOLTAGE POWER SUPPLY CIRCUIT

(75) Inventor: David Michael Hugh Matthews, Sunnyvale, CA (US)

(73) Assignee: Power Integrations, Inc., San Jose, CA (US)

( * ) Notice: Subject to any disclaimer, the term of this patent is extended or adjusted under 35 U.S.C. 154(b) by 231 days.

(21) Appl. No.: 11/485,657

(22) Filed: Jul. 12, 2006

(65) Prior Publication Data

US 2008/0013343 A1 Jan. 17, 2008

(51) Int. Cl.
*G05F 1/40* (2006.01)
(52) U.S. Cl. .................. 323/284; 323/282; 363/56.1
(58) Field of Classification Search ................ 323/207, 323/272–274, 282, 284, 286, 281; 363/16–20, 363/21.04, 21.07, 21.18, 25, 26, 56.1; 307/571, 307/584, 264, 254, 577, 45, 51; 361/84, 361/91.02, 91.04
See application file for complete search history.

(56) References Cited

U.S. PATENT DOCUMENTS

| | | | |
|---|---|---|---|
| 4,890,020 A * | 12/1989 | Bird | ............................ 327/429 |
| 5,457,621 A | 10/1995 | Munday et al. | |
| 5,602,724 A | 2/1997 | Balakrishnan | |
| 5,615,097 A | 3/1997 | Cross | |
| 5,982,639 A | 11/1999 | Balakirshnan | |
| 6,005,781 A | 12/1999 | Balakirshnan | |
| 6,583,997 B1 | 6/2003 | Reid et al. | |
| 7,088,078 B2 * | 8/2006 | Liu | ............................ 323/207 |
| 7,339,805 B2 | 3/2008 | Hemminger et al. | |
| 7,355,867 B2 | 4/2008 | Shuey | |

OTHER PUBLICATIONS

Supertex inc., SR036,SR037, "Inductorless, Dual Output Off-Line Regulators," Supertex, Inc., www.supertex.com, Sunnyvale, CA, U.S.A., pp. 1-15.
Linear Technology, LTC4261, "Negative Voltage Hot Swap Controller with ADC and $I^2$C Monitoring," Linear Technology Corporation, www.linear.com, pp. 1-32, U.S.A.

(Continued)

Primary Examiner—Rajnikant B Patel
(74) Attorney, Agent, or Firm—Blakely Sokoloff Taylor & Zafman LLP

(57) ABSTRACT

A high voltage power supply method and apparatus is disclosed. An apparatus according to aspects of the present invention includes a power supply circuit having a rectifier circuit coupled to input terminals of the power supply circuit that are to be coupled to receive an AC input voltage. A switchmode power converter circuit is coupled to the rectifier circuit to receive a rectified input voltage to generate a regulated output voltage in response to the rectified input voltage. A switch is coupled between the rectifier circuit and the switchmode power converter circuit. A sense circuit is coupled to detect the AC input voltage. The switch is coupled to be switched in response to the sense circuit. The switch is coupled to be switched off when an absolute value of the AC input voltage exceeds a first threshold value. The switch is coupled to be switched on when the absolute value of the AC input voltage is below a second threshold value.

32 Claims, 8 Drawing Sheets

OTHER PUBLICATIONS

ST, AN2264 Application Note, "Three-Phase SMPS for low power applications with VIPer12A," STMicroelectronics, www.st.com, Rev. 1.0, pp. 1-42.

Supertex inc., SR086/SR087, Initial Release, "Adjustable Off-Line Inductorless Switching Regulator," Supertex, Inc., www.supertex.com, Sunnyvale, CA, U.S.A., pp. 1-7.

ST®, VB409SP/VB409(022Y), "Double Output High Voltage Regulator Power I.C.," STMicroelectronics, www.st.com, Jan. 2001, pp. 1-14.

Power Integrations, Inc., "TNY253/254/255 TinySwitch® Family, Energy Efficient, Low Power Off-Line Switchers," Power Integrations, Inc., Apr. 2003, pp. 1-20.

* cited by examiner

METHOD AND APPARATUS FOR A HIGH VOLTAGE POWER SUPPLY CIRCUIT

BACKGROUND INFORMATION

1. Field of the Disclosure

The present invention relates generally to power supplies, and more specifically, the present invention relates to power supplies that have capability to operate from a high voltage AC input voltage.

2. Background

In certain applications of AC/DC power supplies, it is sometimes desirable for the power supply to operate outside the normal operating voltage range. Typically, AC/DC power supplies that are designed for worldwide operation are designed to operate with an AC input voltage between 85-265 VAC rms. However, in emerging markets such as India and China, AC input voltages can be as high as 420 VAC for long periods of time under certain conditions.

In the power supply, the AC input voltage is typically rectified by a rectifier circuit to generate a DC voltage, which is applied to the input of a switchmode power converter stage within the power supply. A rectified 420 VAC rms signal generates a peak DC voltage of almost 600V. This high DC voltage greatly increases the cost of the switchmode power converter circuit since all circuitry must be rated for this high voltage condition. In particular, the input capacitors that are normally rated for 400V for an 85-265 VAC rms supply must be increased in voltage rating to at least 600V. This is normally achieved by connecting two 400V capacitors in series across the output terminals of the rectifier circuit. In order to achieve the same effective capacitance in this series arrangement, each capacitor must also be double the capacitance value of the single 400V capacitor they are replacing.

The cost of the power supply circuit is therefore greatly increased in this instance by adding the large additional input capacitors. The space taken by the additional capacitors required is also unacceptable in many applications such as AC/DC power supplies for cell phone charging applications where small enclosures and lightweight are key requirements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Examples of apparatuses and methods for implementing a high voltage power supply circuit are disclosed. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures or characteristics may be combined for example into any suitable combinations and/or sub-combinations in one or more embodiments.

A high voltage power supply circuit and method for implementing such a circuit in accordance with the teachings of the present invention will now be described. Embodiments of the present invention involve methods and apparatuses to generate high voltage power supply circuits.

Figure 1:
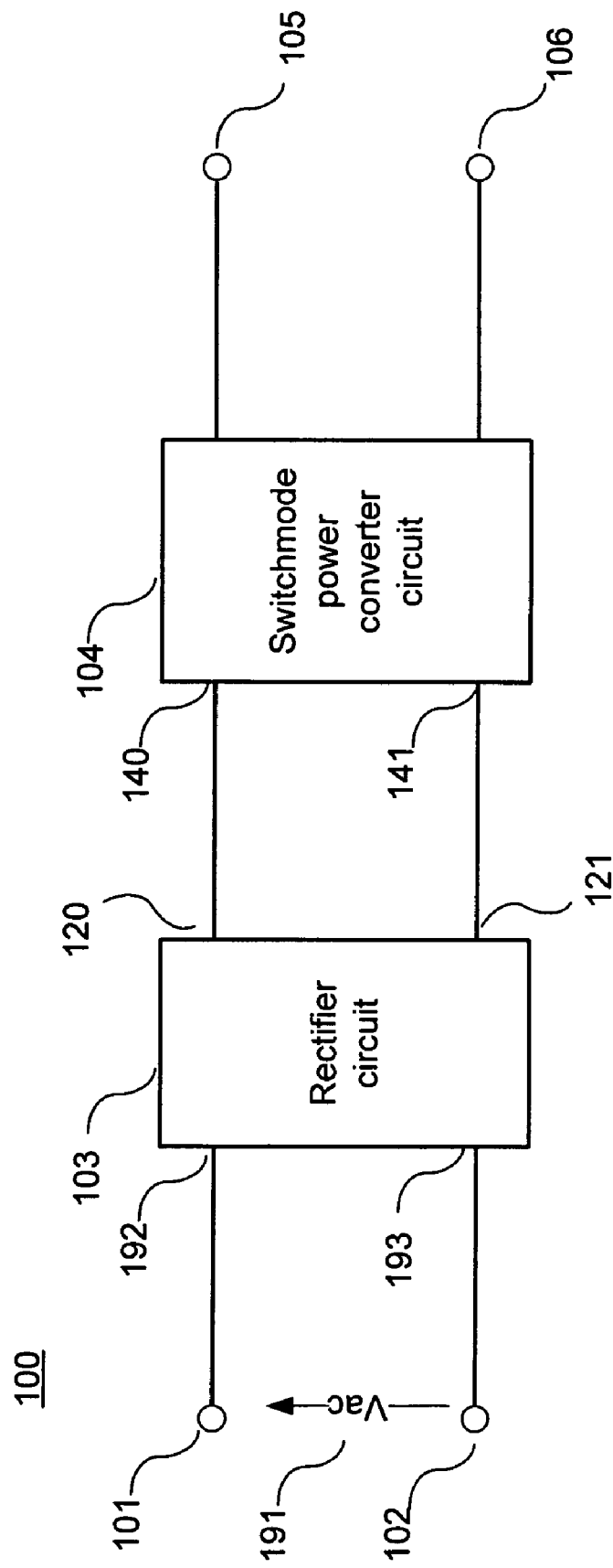
FIG. 1 is a block diagram illustrating generally an example of a power supply designed to receive an AC input voltage in accordance with the teachings of the present invention.

FIG. 1 shows generally a block diagram of a power supply circuit 100. As shown, power supply circuit 100 includes power supply input terminals 101 and 102, which are coupled to receive an AC input voltage 191. A rectifier circuit 103 having input terminals 192 and 193 is coupled to the power supply input terminals 101 and 102. The rectifier circuit 103 has output terminals 120 and 121, which are coupled to the input terminals 140 and 141 of a switchmode power converter 104. In the illustrated example, the rectifier circuit 103 could be one of several commonly used rectifier circuits such as for example, but not limited to, a full wave rectifier circuit or a half wave rectifier circuit. The switchmode converter circuit 104 could be one of several commonly used circuit configurations such as for example, but not limited to, a flyback converter, a forward converter, a buck converter, SEPIC converter, a Cuk converter, or the like, and could employ any one of a number of control schemes to regulate the output of the switchmode converter 104 at the output terminals 105 and 106. These control schemes could include, but are not limited to, voltage mode pulse width modulation (PWM), current mode PWM, on/off, hysteretic, resonant, quasi-resonant and self oscillating (switchmode converters using this type of control are often referred to as RCC converters).

Figure 2:
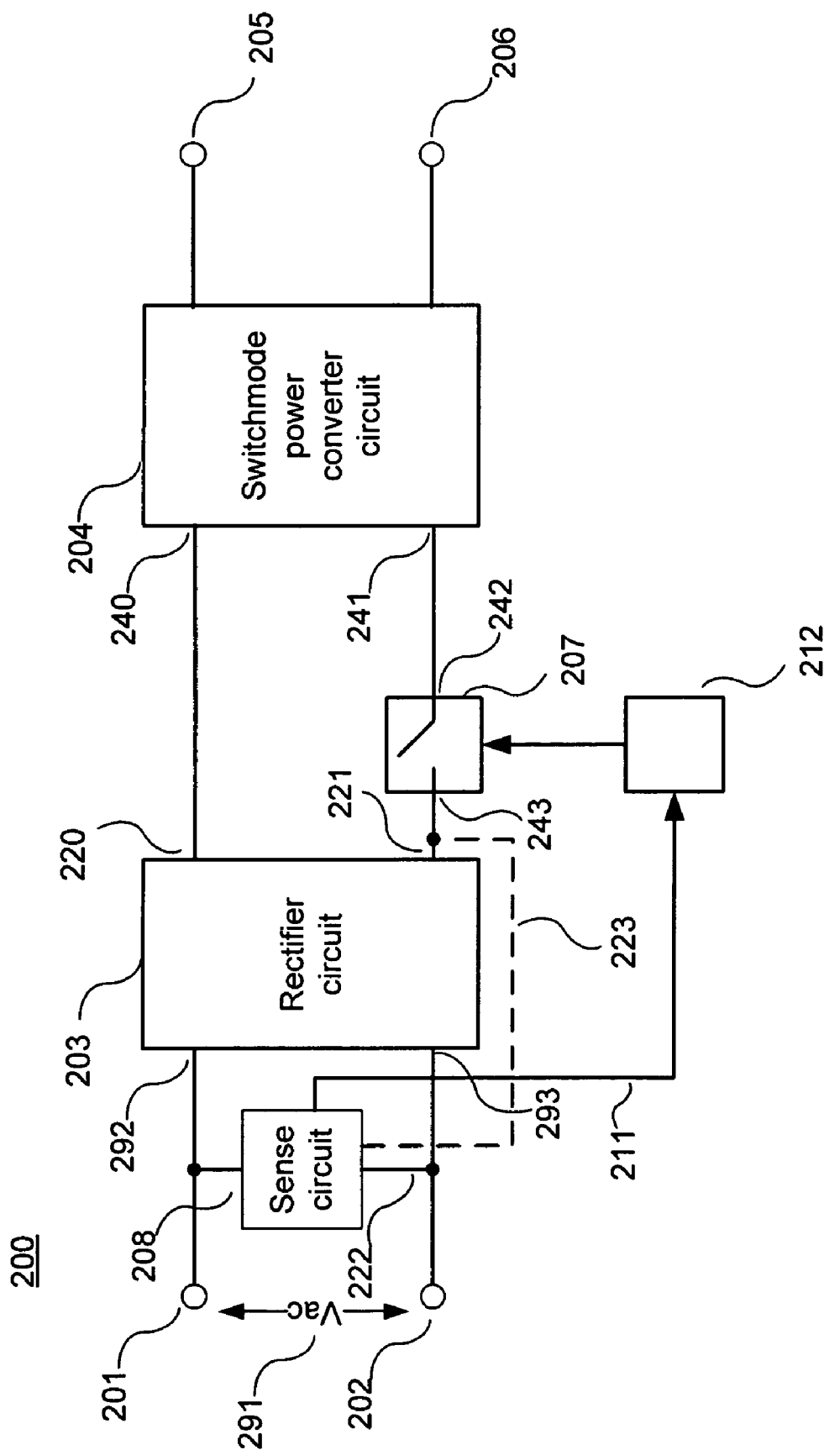
FIG. 2 is a block diagram illustrating generally an example of a high voltage power supply circuit employing a switch to limit the voltage applied to a switchmode converter stage of the power supply, with a sense circuit sensing the voltage between the AC input terminals in accordance with the teachings of the present invention.

FIG. 2 is a block diagram showing generally one example of a power supply circuit 200 in accordance with the teachings of the present invention. As shown, power supply circuit 200 includes input terminals 201 and 202 that are coupled to receive an AC input voltage 291. A rectifier circuit 203 has input terminals 292 and 293 that are coupled to the power supply input terminals 201 and 202. The rectifier circuit 203 has output terminals 220 and 221. Output terminal 220 is coupled to a first input terminal 240 of switchmode power converter 204. Output terminal 221 is coupled to a first terminal 243 of a switch 207. A second input terminal 241 of switchmode converter 204 is coupled to a second terminal 242 of switch 207.

As shown in FIG. 2, power supply circuit 200 also includes a sense circuit 208, which is a voltage sense circuit coupled to sense or detect the voltage between the power supply input terminals 201 and 202. In the example, sense circuit 208 is coupled to a drive circuit 212, which is coupled to drive the switch 207 on or off depending on the magnitude of the voltage sensed by sense circuit 208. In the illustrated example, the switch 207 is coupled to be off when the absolute value of the voltage 291 between the input terminals 201 and 202 exceeds a first threshold value. In one example, the first threshold value is determined by the design of sense circuit 208. Furthermore, the sense circuit is coupled to the switch 207 such that the switch is on when the absolute value of the voltage 291 between the input terminals 201 and 202 is below a second threshold value. In the example, the switch 207 is off for the duration of the period between the time where the absolute value of the voltage 291 between the input terminals 201 and 202 exceeds the first threshold value and the time when the absolute value of the voltage 291 between the input terminals 201 and 202 goes below a second threshold value. During this off state, the switch 207 is not periodically switched on and off and is not in a current limit state but is in an off state for the complete time.

In one example, the first and second threshold values may be substantially equal for simplicity of the sense circuit 208. However, in another example, there may be some hysteresis in the input voltage values in which the first threshold voltage level is higher than the second voltage threshold level. Such an example will be discussed in more detail below in connection with the examples shown in FIGS. 4A and 4B. Referring back to the example shown in FIG. 2, the voltage between first and second terminals 243 and 242 of switch 207 when the switch 207 is off is substantially equal to the difference between the absolute value of the voltage between the power supply input terminals 201 and 202 and the voltage between the first and second terminals 240 and 241 of the switchmode converter 204. In this example, the voltage between the input terminals 240 and 241 of switchmode converter 204 never exceeds the first threshold voltage value set in sense circuit 208. In conditions where the input voltage 291 exceeds this first threshold value therefore, the switch 207 will protect the switchmode converter 204 and instead the excess voltage will be dropped across switch 207 while it is off.

It is noted that a capacitor often referred to as a bulk capacitor of the switchmode converter that is coupled between input terminals 240 and 241 is not shown but may be included in the example illustrated in FIG. 2. The bulk capacitor stores energy for the switchmode converter 204 to continue operating while switch 207 is off. As such, the switchmode power converter 204 will continue to operate normally whether switch 207 is on or off as long as the period of the off state is short enough that the switchmode converter 204 bulk capacitor is still sufficiently charged for the switchmode converter 204 to operate. This is typically easily achieved since the AC input voltage between input terminals 201 and 202 exceeds the first threshold voltage level and remains above the second threshold level for a short period of typically only a few milliseconds for each half cycle of the input AC voltage 291. The example shown in FIG. 2 therefore allows the switchmode converter 204 to be designed only for input voltages up to the first threshold voltage level since the switch 207 is coupled to limit the maximum voltage between the first and second input terminals 240 and 241 of the switchmode power converter 204 when the voltage between the power supply input terminals 201 and 202 exceeds a threshold value.

In one example, the sense circuit 208 in FIG. 2 may be referenced to the output terminal 221 of the rectifier circuit, as shown by the dashed line connection 223. However, since the voltage between rectifier circuit 203 output terminal 221 and input terminal 293 is typically 1 volt or less when current is flowing from output terminal 221 to input terminal 293 with a standard diode rectification circuit, the reference for sense circuit 208 can also be taken from the input terminal 202 as shown by connection 222 in FIG. 2.

In one example, the switch 207 shown in the block diagram of FIG. 2 will be on continuously when the absolute value of the input voltage 291 is below the first and second threshold voltage levels. In a typical power supply design, the first and second threshold voltage levels will be set somewhere above the normal operating AC input voltage of the geographical region where the power supply 201 is to be used. For example, in a geography when the nominal AC line voltage is 230 VAC rms, the sense circuit 208 might be designed such that the first threshold level is at an absolute value of input voltage 291 of 450V, which is the approximate peak voltage of a 318 VAC rms AC input voltage. In the example, the second threshold level might then be set at a voltage level less than or equal to the first threshold voltage level, such as for example at 425V. Therefore, in this example, only when the AC input voltage 291 rises above 318 VAC rms will switch 207 be turned from an on state to an off state for the portion of the AC input waveform where the absolute value of voltage 291 exceeds the first threshold level of 450 V and remains above the second voltage threshold level of 425V, in accordance with the teachings of the present invention. In an example, the type of switch that may be employed for switch 207 is very flexible and can be a semiconductor switch such as a bipolar transistor, a metal oxide semiconductor field effect transistor (MOSFET) or an insulated gate bipolar transistor (IGBT).

In addition, the frequency at which the switch will be turned on and off is relatively low, as AC line frequencies are typically in the range of 47-60 Hz depending on the geographical region. Thus, it is feasible that a semiconductor switch, such as a gate turn off thyristor, or even a mechanical switch, such as a relay, could be used in some examples for switch 207 in accordance with the teachings of the present invention. Regardless of the type of switch used for switch 207, the voltage across the switch 207 when it is on can be regarded as substantially zero since it will be so much smaller than the magnitude of the input voltage 291. When the switch 207 is off, substantially zero current flows between the switch 207 terminals 242 and 243. The voltage between input terminals 240 and 241 of switchmode power converter 204 is therefore unregulated when the switch 207 is off.

Figure 3:
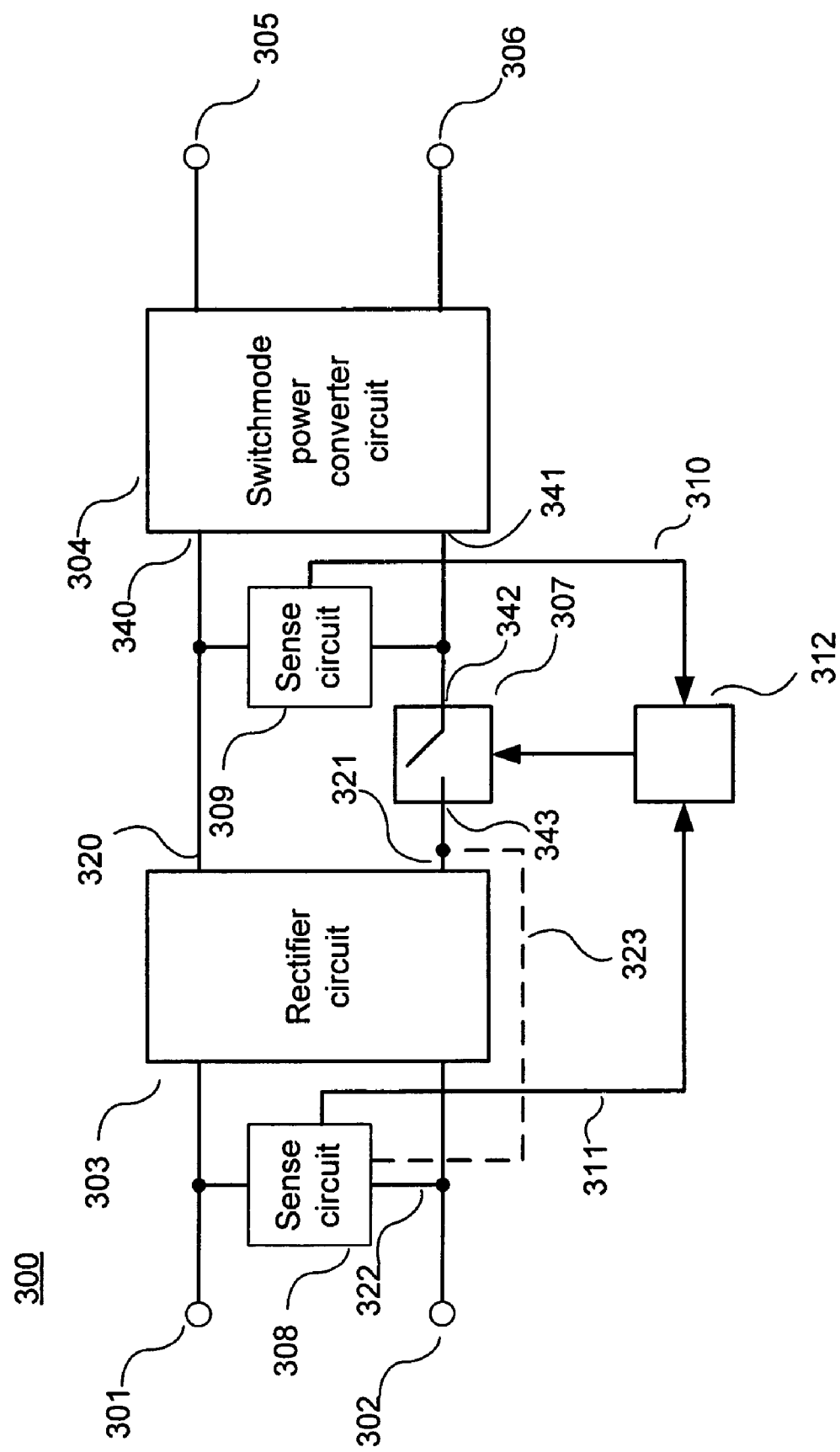
FIG. 3 is a block diagram illustrating generally an example of a high voltage power supply circuit employing a switch to limit the voltage applied to a switchmode power converter stage of the power supply, with sense circuits sensing the voltage between the AC input terminals and the voltage across input terminals of the switchmode power converter in accordance with the teachings of the present invention.

FIG. 3 shows generally a block diagram of another example of a power supply circuit 300 in accordance with the teachings of the present invention. The example power supply circuit 300 of the block diagram of FIG. 3 shares many aspects with the example power supply circuit 200 of the block diagram of FIG. 2. However, in example power supply circuit 300, the example sense circuit is split into multiple portions, which are labeled in FIG. 3 as sense circuit 308 and 309. As shown, the portion of the sense circuit labeled sense circuit 308 is coupled to the power supply input terminals 301 and 302 while the portion of the sense circuit labeled sense circuit 309 is coupled to the input terminals 340 and 341 of switchmode power converter circuit 304. In the example, a voltage between the input terminals 340 and 341 of the switchmode power converter circuit 304 is substantially equal to the absolute value of the AC input voltage between the power supply input terminals 301 and 302.

In the example, the voltage appearing across input terminals 340 and 341 of switchmode power converter 304 is directly sensed by sense circuit portion 309, which provides a signal 310 to drive circuit 312 in order to switch the switch 307 from an on state to an off state when the voltage between the first and second input terminals 340 and 341 of switchmode converter 304 exceeds a first threshold value. In the example, the switch 307 is coupled to be switched on when the absolute value of the voltage between the power supply input terminals 301 and 302 sensed by sense circuit portion 308 is below a second threshold value. Although the voltage sensing to determine when switch 307 is to be turned from an on state to an off state in FIG. 3 is performed at a different locations by sense circuit portions 308 and 309 compared to the power supply 200 example illustrated in FIG. 2, the result is the same in that the maximum voltage between the input terminals 340 and 341 of switchmode converter 304 is limited in accordance with the teachings of the present invention.

Figure 4A:
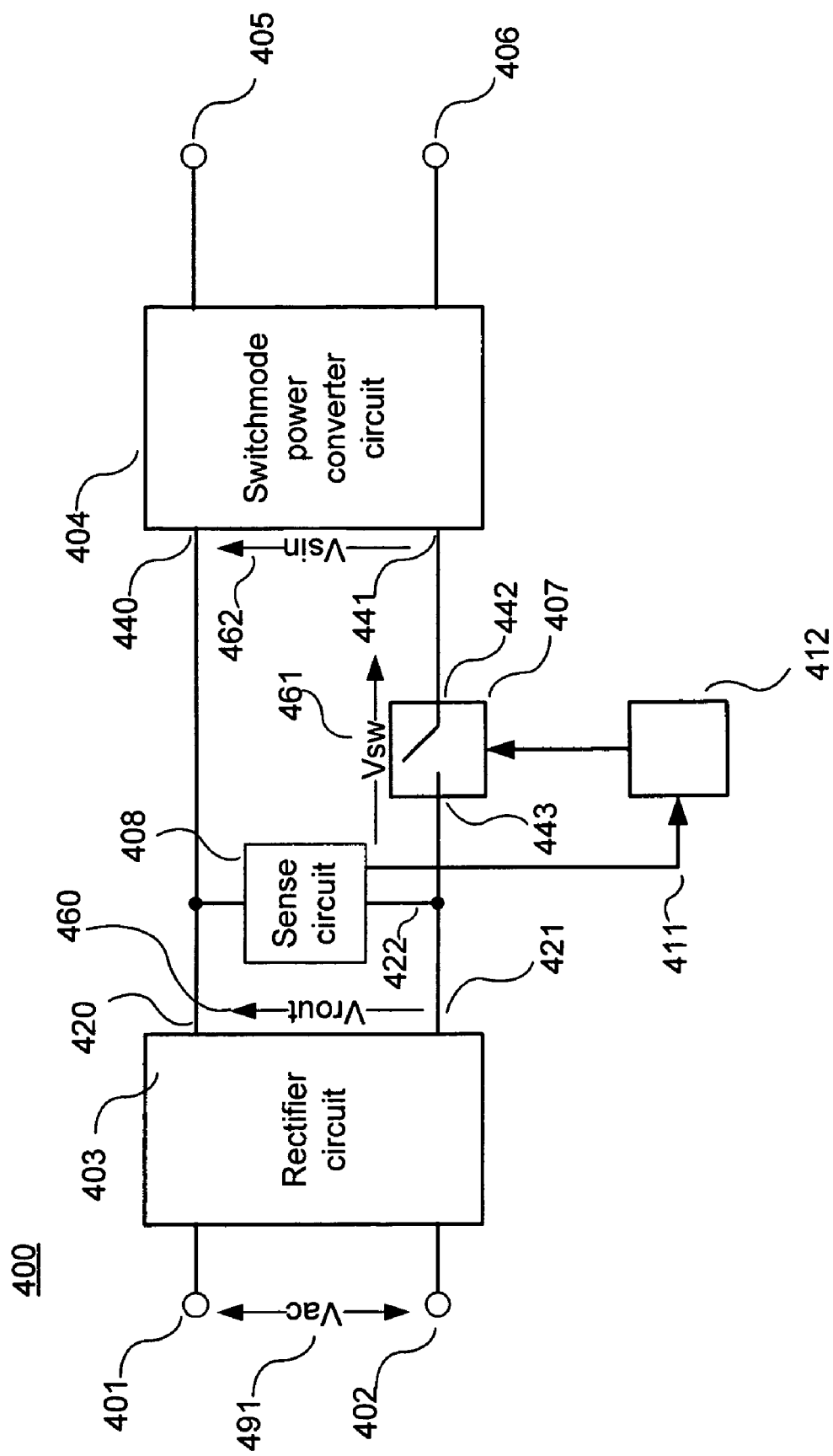
FIG. 4A is a block diagram illustrating generally an example of a high voltage power supply circuit employing a switch to limit the voltage applied to a switchmode power converter stage of the power supply, with a sense circuit sensing the voltage at the output of the rectifier circuit in accordance with the teachings of the present invention.

FIG. 4A shows generally a block diagram of another example of a power supply circuit 400 in accordance with the teachings of the present invention. As shown, the example power supply circuit 400 of the block diagram of FIG. 4A shares many aspects with the example power supply circuits 200 and 300 shown in FIG. 2 and FIG. 3. However, in power supply circuit 400 of FIG. 4, the sense circuit 408 is coupled to sense the voltage between the output terminals 420 and 421 of the rectification circuit 403. In the example, the switch 407 is therefore coupled to be off when the voltage between the first and second output terminals 420 and 421 of the rectifier circuit 403 exceeds a first threshold value in accordance with the teachings of the present invention.

In the example, the switch 407 is coupled to be on when the voltage between first and second output terminals 420 and 421 of the rectifier circuit 403 is below a second threshold value. In addition, since the rectification circuit 403 is typically a simple diode bridge having very low voltage drop in the forward direction of typically less than 2 V, for the purposes of the power supply 400 operation, the voltage between the output terminals 420 and 421 of the rectification circuit 403 can also be regarded as substantially equal to the absolute value of the AC input voltage between power supply input terminals 401 and 402 in accordance with the teachings of the present invention.

Figure 4B:
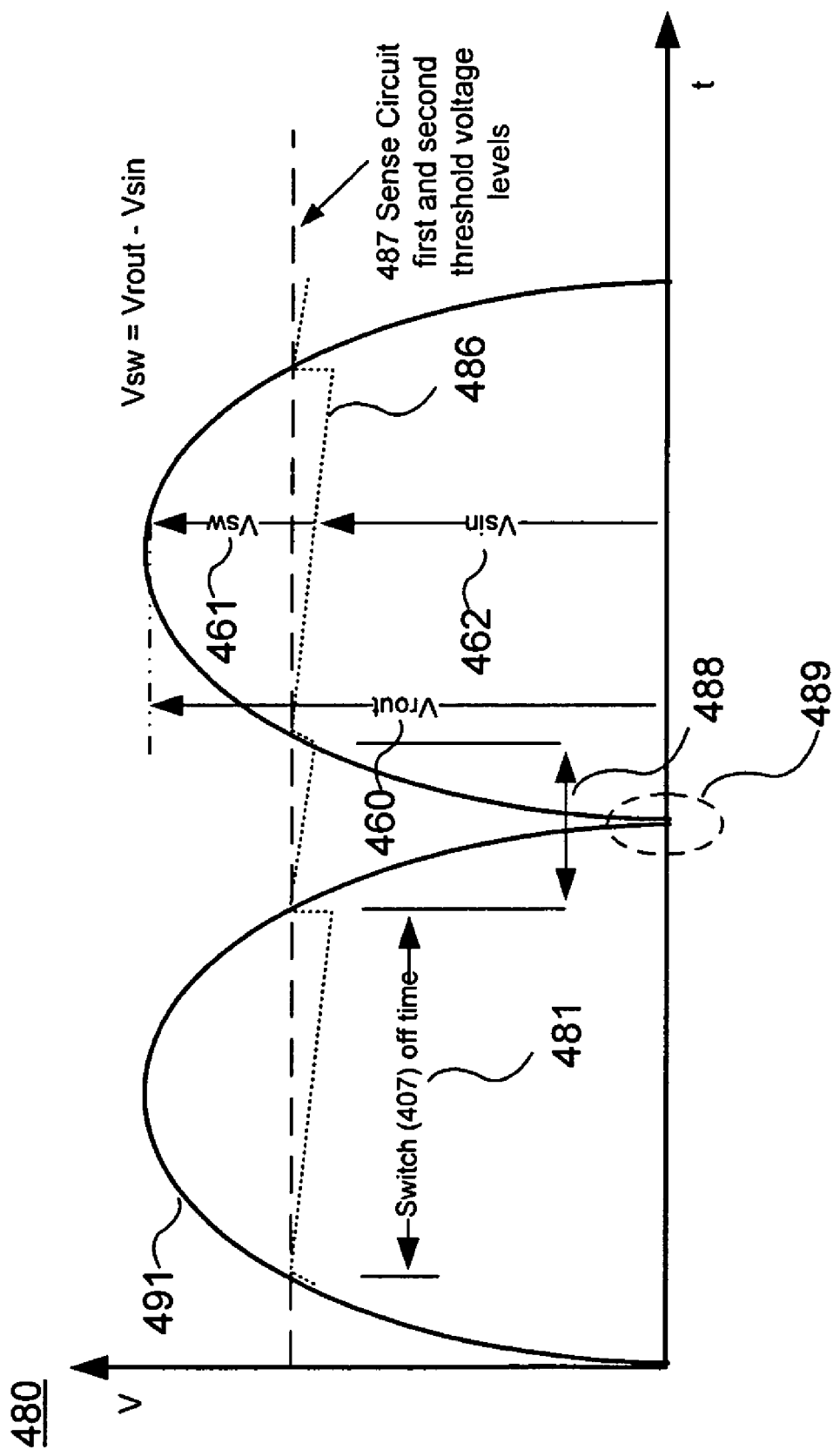
FIG. 4B shows generally example voltage waveforms and identifies the magnitude of key voltages during the circuit operation in accordance with the teachings of the present invention.

FIG. 4B illustrates generally typical waveforms 480 that would be observed during the operation of example power supply 400. In this example, first and second threshold voltage levels are assumed equal as a single voltage threshold level 487 as shown. In an example with hysteresis, the first and second thresholds would be different. As shown in the illustration, the AC input voltage waveform 491 exceeds the threshold voltage level 487 for a time period 481 during each half cycle of the AC input voltage waveform 491. During period 481, switch 407 in FIG. 4A is off. For the remainder of the time, switch 407 can be on.

In one example, whether switch 407 actually remains on at all times other than period 481 in FIG. 4B depends on the design of sense circuit 408 and drive circuit 412 in FIG. 4A. For example during period 488 in FIG. 4B, input voltage waveform 491 is at a very low voltage during period 489. The sense circuit 408 and drive circuit 412 may not have sufficient supply voltage to remain operational. If this is the case, drive circuit 412 may not be able to maintain switch 407 in an on state and switch 407 may transition to an off state until the absolute value of supply voltage waveform 491 is sufficient to sustain operation of sense circuit 408 and drive circuit 412. It is appreciated that even if switch 407 does transition to an off state for the above reasons during a period 489 when it would otherwise be in an on state, at least some of the benefits provided by the power supply circuit are retained in accordance with the teachings of the present invention. The reason is that during this period 489, no current is flowing into switchmode power converter circuit 404 input terminal 440 in any case since the value of Vsin 462 during period 489 is greater than the absolute value of input voltage 491. During the switch 407 off time 481, the voltage across first and second terminals 443 and 442 of switch 407, or Vsw 461, is substantially equal to the difference between the rectifier circuit 403 output voltage Vrout 460 and the switchmode power converter 404 input voltage Vsin 462. During the switch 407 off time 481 there is no current flow in rectifier circuit 403, the rectifier output voltage 460 in FIG. 4A is then substantially equal to the absolute value of the AC input voltage 491.

The rectifier output voltage 460 is therefore representative of the magnitude of the voltage between the power supply input terminals 401 and 402. In FIG. 4A therefore, when switch 407 is off, Vsw 461 is substantially equal to the difference between the absolute value of the voltage 491 between the power supply input terminals 401 and 402 and the voltage 462 between first and second input terminals 440 and 441 of the switchmode power converter 404. The waveforms of FIG. 4B also show the fact that Vsin 462 drops during the switch 407 off time 481. This is because Vsin 462 is unregulated during period 481. The slope of the voltage waveform 486 during period 481 is determined by the voltage across a bulk capacitor coupled between terminals 440 and 441 internal to the switchmode power converter 404 and the loading at the output terminals 405 and 406, which is described in more detail below in the schematic diagrams of FIG. 6 and FIG. 7.

Figure 5:
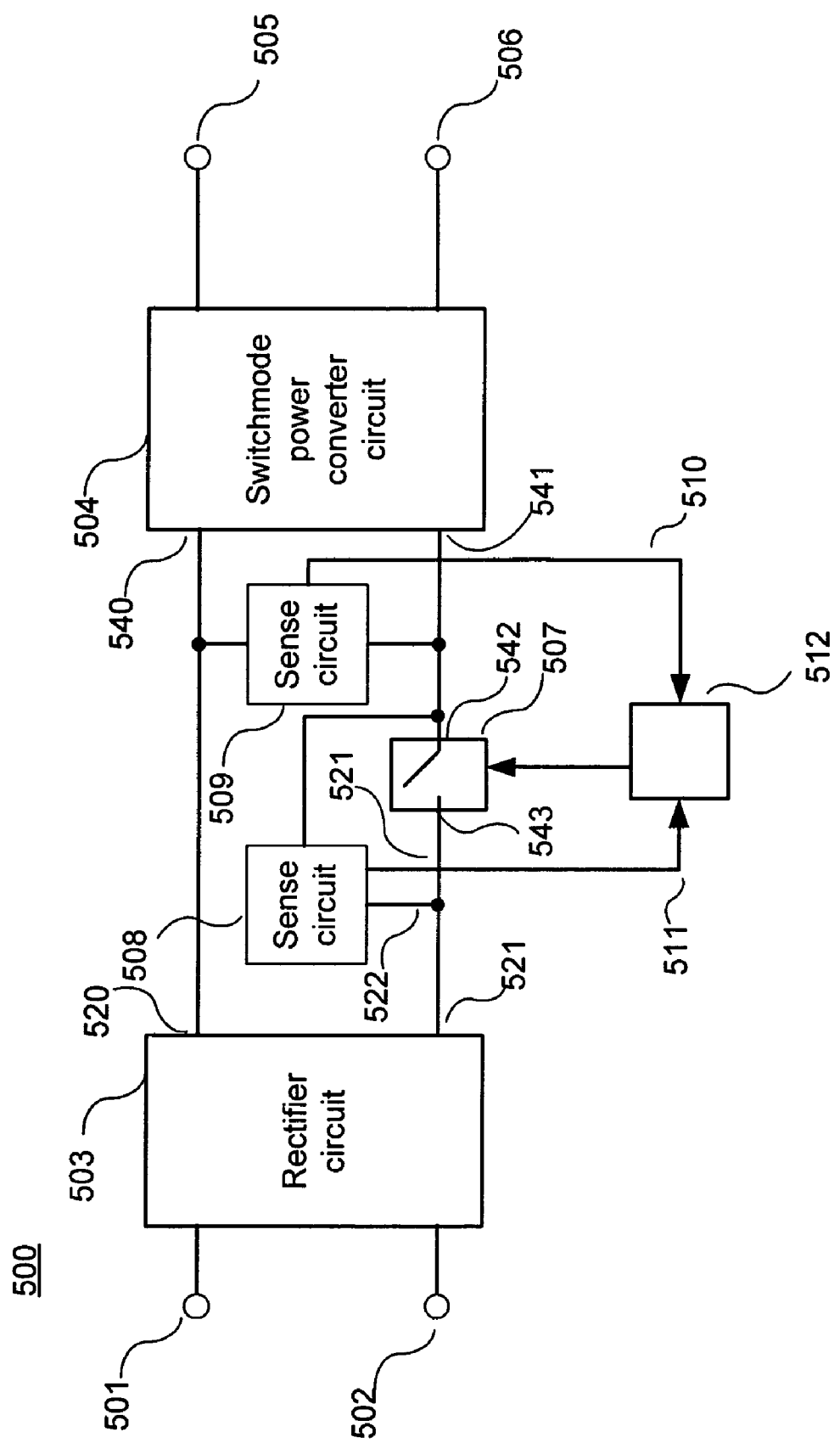
FIG. 5 is a block diagram illustrating generally an example of a high voltage power supply circuit employing a switch to limit the voltage applied to a switchmode converter stage of the power supply, with sense circuits sensing the voltage across the switch and the voltage across input terminals of the switchmode power converter in accordance with the teachings of the present invention.

FIG. 5 shows generally a block diagram of another example of a power supply circuit 500 in accordance with the teachings of the present invention. The example power supply circuit 500 of FIG. 5 shares aspects with the power supply circuits 200, 300 and 400 of FIGS. 2, 3 and 4. However, in power supply circuit 500 of FIG. 5, the voltage appearing across input terminals 540 and 541 of switchmode power converter 504 is directly sensed by sense circuit portion 509, which provides a signal 510 to drive circuit 512 in order to switch the switch 507 from an on state to an off state when the voltage between the first and second input terminals 540 and 541 of switchmode converter 504 exceeds a first threshold value.

As shown in the depicted example, switch 507 is coupled to be switched from an off state to an on state when the voltage across switch 507 is below a second threshold value when the switch 507 is off. As shown in the illustrated example, sense circuit portion 508 senses the voltage across switch 507 and provides a signal 511 to drive circuit 512 to achieve this functionality. Although the voltage sensing to determine when switch 507 is to be switched from an off state to an on state in FIG. 5 is performed at a different location within the power supply circuit 500 than in power supply circuit 300 of FIG. 3, the result is the same in that the maximum voltage between the input terminals 540 and 541 of switchmode converter 504 is limited.

Figure 6:
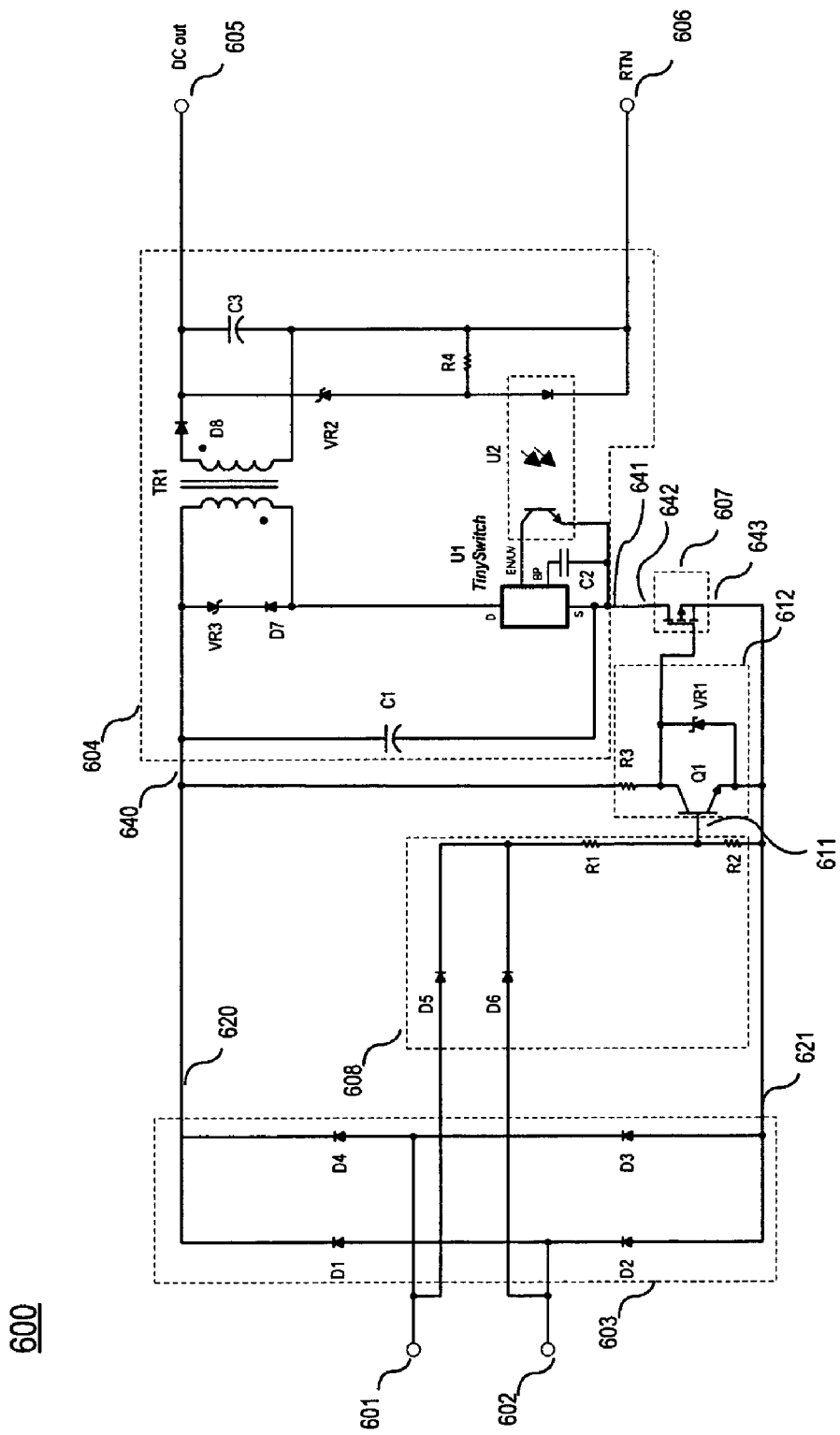
FIG. 6 shows a schematic illustrating generally an example of a high voltage power supply circuit with a sense circuit sensing the voltage between the AC input terminals in accordance with the teachings of the present invention.

FIG. 6 is a schematic that shows generally one example of a power supply circuit 600 in accordance with the teachings of the present invention. It is noted that the example power supply circuit 600 shown in FIG. 6 has similarities to the example power supply circuit 200 shown in FIG. 2. As shown in the example illustrated in FIG. 6, power supply circuit 600 includes a switchmode power converter 640 including a TinySwitch power converter device, available from Power Integrations, Inc., of San Jose, Calif. In the example, sense circuit 608 senses the voltage between input terminals 601 and 602 and output terminal 621 of rectifier circuit 603, which is equivalent to the connection 223 to output terminal 221 of rectifier circuit 203 in FIG. 2. In the illustrated example, sense circuit 608 is an AC voltage sense circuit since it is directly coupled to the AC input terminals 601 and 602. Diodes D5 and D6 rectify the voltage signals on input terminals 601 and 602 and apply this voltage to the resistor divider formed by resistors R1 and R2. When the voltage across resistor R2 exceeds the base emitter threshold voltage of transistor Q1, signal 611 turns on transistor Q1, which forms part of drive circuit 612. The collector of transistor Q1 is pulled low, which in turn pulls the gate of switch 607 low turning off switch 607. In the illustrated example, drive circuit 612 also includes resistor R3, which provides a pull up signal to the gate of switch 607 when transistor Q1 is off, to turn switch 607 on. Zener diode VR1 provides a clamp that limits the maximum pull up voltage applied to the gate of switch 607.

In the example shown in FIG. 6, rectifier circuit 603 is a full wave rectifier. The output terminals 620 and 621 of rectifier circuit 603 are coupled to first terminal 640 of switchmode converter 604 and to first switch terminal 643 of switch 607. A second input terminal 641 of switchmode converter 604 is coupled to a second terminal 642 of switch 607. The example schematic of FIG. 6 shows the bulk capacitor C1 of switchmode converter 604 as discussed earlier. Capacitor C1 provides the energy storage that sustains the operation of switchmode converter 604 during the period that switch 607 is off. In one example, capacitor C1 is used during the operation of switchmode power converter 604 even when switch 607 is on. This is because as shown in FIG. 4B for the period 488, where the input AC voltage 491 is less than the bulk capacitor voltage 486, the switchmode power converter 604 continues to operate. This bulk capacitor C1 is therefore used even in standard circuits where switch 607 is not used and, therefore, there is no cost penalty associated with the use of bulk capacitor C1 in accordance with the teachings of the present invention.

Figure 7:
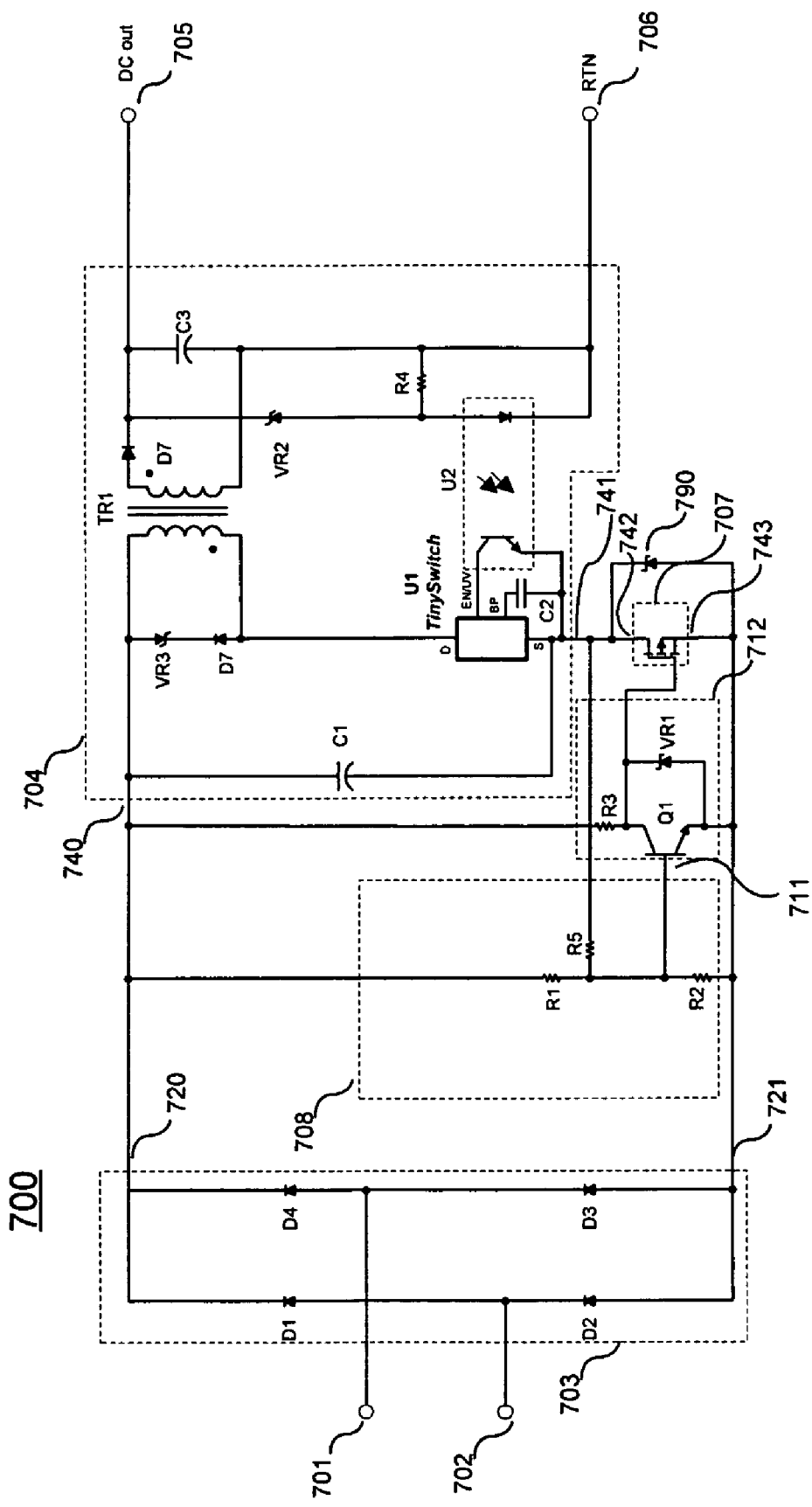
FIG. 7 shows a schematic illustrating generally an example of a high voltage power supply circuit with a sense circuit sensing the voltage at the output of the rectifier circuit.

FIG. 7 is a schematic showing generally another example of a power supply circuit 700 in accordance with the teachings of the present invention. It is noted that the example power supply circuit 700 shown in FIG. 7 has similarities with the example power supply circuit 400 shown in FIG. 4A. As shown in the example illustrated in FIG. 7, power supply circuit 700 includes a switchmode power converter 704 including a TinySwitch power converter device, available from Power Integrations, Inc., of San Jose, Calif. In the example, sense circuit 708 senses the voltage between output terminals 720 and 721 of rectifier circuit 703 and applies a signal 711 to drive circuit 712, which drives switch 707 on and off according to the operation of the sense circuit 708 similar to that as described above for example with reference to power supply circuit 600 of FIG. 6.

As shown in the example of FIG. 7, power supply circuit 700 also shows a component 790 coupled across switch 707, which is a protective clamp component to limit the maximum voltage across switch 707 when switch 707 is off. Clamp component 790 may be used in some implementations of the power supply circuit 700 where for example lightning surge voltage tests are carried out under conditions when switch 707 is off. Under these conditions, a high voltage surge is typically applied between AC input terminals 701 and 702. Typical surge voltages are in the range of 1000 to 2000V. Since the voltage across switch 707 in the off state is the difference between the voltage between input terminals 701 and 702 and the voltage between input terminals 740 and 741 of switchmode converter 704, clamp component 790 is included in the example to help avoid damage to switch 707.

In the example, when a threshold voltage determined by the choice of clamp component 790 is reached across switch 707, the clamp component 790 allows current to flow through clamp component 790 and the bulk capacitor C1. Bulk capacitor then absorbs the surge energy with very little additional voltage rise across capacitor C1, which allows power supply circuit 700 to safely meet surge voltage withstand testing. Although the illustrated example shows as a Zener diode in FIG. 7, component 790 could be a metal-oxide-varistor or other semiconductor clamp component or even split into a resistor and capacitor snubber network, or other suitable technique in accordance with the teachings of the present invention.

Other protective components in certain example applications of power supply 700 could be the use of an optional resistive element (not shown) coupled between the first terminal 743 of switch 707 and the output terminal 721 of rectifier circuit 703, which would limit in rush current during power supply turn on at high input voltage.

In the illustrated example, resistor R5 in sense circuit 708 is an optional component that creates hysteresis in sense circuit 708 to separate the first voltage threshold level and the second voltage threshold levels, as described previously. For example, when the first voltage threshold level, determined by sense circuit 708 is reached, transistor Q1 turns on and switch 707 is switched off as described above. When this happens, the voltage across switch 707 will rise, feeding current through resistor R5 to further increase the current flowing into the base of transistor Q1. The connection of resistor R5 will therefore cause the voltage between rectifier circuit 703 output terminals 720 and 721 to be lower than the first threshold voltage level for transistor Q1 to be switched from an on state to an off state. This in turn will cause the second voltage threshold level to be lower than the first voltage threshold level and therefore introduce some hysteresis into the operation of voltage sense circuit 708. It is appreciated that this is only one example of a low cost implementation of hysteresis and that there are many other circuits that could be used to implement hysteresis in accordance with the teachings of the present invention.

It is appreciated that the examples power supply circuits 600 and 700 illustrated in FIGS. 6 and 7 share a similarity in that no external bias circuitry is added for sense circuits 608 and 708 to provide the added function in accordance with the teachings of the present invention. Therefore, there is no requirement to power the sense circuits 608 and 708, switches 607 and 707 or drive circuits 612 and 712 from the output of the switchmode power converters 604 and 704 in accordance with the teachings of the present invention. There is also no requirement for any biasing means coupled between first and second terminals of switches 607 and 707. Indeed, in the example, the drive current required to drive switch 607 in FIG. 6 is derived entirely from the AC input voltage coupled to be received between input terminals 601 and 602 and the voltage between and output terminals 620 and 621 of rectifier circuit 603 in accordance with the teachings of the present invention. In the example shown in FIG. 7, the drive current required to drive switch 707 is derived entirely from the voltage between and output terminals 720 and 721 of rectifier circuit 703 in accordance with the teachings of the present invention. Furthermore, there is no requirement in any of the examples for a solenoid to trip or activate the operation of any of the circuitry in FIG. 6 or FIG. 7 in accordance with the teachings of the present invention.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A power supply circuit, comprising:
   a rectifier circuit coupled to input terminals of the power supply circuit to be coupled to receive an AC input voltage;
   a switchmode power converter circuit coupled to the rectifier circuit to receive a rectified input voltage to generate a regulated output voltage in response to the rectified input voltage;
   a switch coupled between the rectifier circuit and the switchmode power converter circuit; and
   a sense circuit coupled to detect the AC input voltage, wherein the switch is coupled to be switched in response to the sense circuit, wherein the switch is coupled to be switched off when an absolute value of the AC input voltage exceeds a first threshold value and wherein the switch is coupled to be switched on when the absolute value of the AC input voltage is below a second threshold value.

2. The power supply circuit of claim 1 wherein the sense circuit is coupled to the input terminals of the power supply circuit to detect the AC input voltage.

3. The power supply circuit of claim 1 wherein the sense circuit is coupled to input terminals of the switchmode power converter circuit to detect when the absolute value of the AC input voltage exceeds the first threshold value to turn off the switch and wherein the sense circuit is coupled to the input terminals of the power supply circuit to detect when the absolute value of the AC input voltage is below the second threshold value to turn on the switch.

4. The power supply circuit of claim 3 wherein a voltage between input terminals of the switchmode power converter circuit is substantially equal to the absolute value of the AC input voltage.

5. The power supply circuit of claim 1 wherein the sense circuit is coupled to output terminals of the rectifier circuit to detect the absolute value of the AC input voltage.

6. The power supply circuit of claim 5 wherein a voltage across the output terminals of the rectifier circuit is substantially equal to the absolute value of the AC input voltage.

7. The power supply circuit of claim 5 wherein a voltage across the output terminals of the rectifier circuit is representative of a magnitude of the AC input voltage.

8. The power supply circuit of claim 5 wherein the switch is coupled to be switched from on to off to limit a maximum voltage between input terminals of the switchmode power converter in response to the sense circuit.

9. The power supply circuit of claim 1 wherein the sense circuit is coupled to input terminals of the switchmode power converter circuit to detect when the absolute value of the AC input voltage exceeds the first threshold value to turn off the switch and wherein the sense circuit is coupled across the switch to detect when the absolute value of the AC input voltage is below the second threshold value to turn on the switch.

10. The power supply circuit of claim 9 wherein a voltage across the switch when the switch is off is substantially equal to a difference between the absolute value of the AC input voltage and a voltage between input terminals of the switchmode power converter.

11. The power supply circuit of claim 1 wherein a voltage across the switch when the switch is on is substantially zero.

12. The power supply circuit of claim 1 wherein the first and second voltage threshold values are substantially equal.

13. The power supply circuit of claim 1 wherein the first voltage threshold value is greater than the second voltage threshold value.

14. The power supply circuit of claim 1 wherein the switchmode power converter is one of a flyback converter, a forward converter, a buck converter, a SEPIC converter or a Cuk converter.

15. The power supply circuit of claim 1 wherein the switch comprises a semiconductor switch.

16. The power supply circuit of claim 15 wherein the semiconductor switch comprises one of a bipolar transistor, a metal oxide semiconductor field effect transistor (MOSFET), an insulated gate bipolar transistor (JGBT) or a gate turn off thyristor.

17. The power supply circuit of claim 1 wherein the switch comprises a mechanical switch.

18. The power supply circuit of claim 17 wherein the mechanical switch comprises a relay.

19. The power supply circuit of claim 1 further comprising a drive circuit coupled between the sense circuit and the switch, the drive circuit coupled to drive the switch on or off in response to the sense circuit.

20. The power supply circuit of claim 1 wherein a voltage between input terminals of the switchmode power convener is unregulated when the switch is off.

21. The power supply circuit of claim 1 wherein the rectifier circuit includes first and second outputs and the switchmode power converter circuit includes first and second inputs, wherein the first output of the rectifier circuit is coupled to the first input of the switchmode power converter circuit and wherein the switch is coupled between the second output of the rectifier circuit and the second input of the switchmode power converter circuit.

22. A method of regulating a power supply, comprising:
   rectifying an AC input voltage received at input terminals of a power supply circuit with a rectifier circuit;
   generating a regulated output voltage at output terminals of the power supply circuit with a switchmode power converter circuit coupled to receive a rectified input voltage from the rectifier circuit;
   switching off a switch coupled between the rectifier circuit and the switchmode power converter circuit when an absolute value of the AC input voltage exceeds a first threshold value; and
   switching on the switch coupled between the rectifier circuit and the switchmode power converter circuit when the absolute value of the AC input voltage is below a second threshold value.

23. The method of regulating the power supply of claim 22 further comprising sensing the AC input voltage at the input terminals of the power supply circuit with a sense circuit.

24. The method of regulating the power supply of claim 22 wherein switching off the switch coupled between the rectifier circuit and the switchmode power converter circuit comprises sensing the AC input voltage at input terminals of the switchmode power converter and wherein switching on the switch coupled between the rectifier circuit and the switchmode power converter circuit comprises sensing the AC input voltage at the input terminals of the power supply circuit.

25. The method of regulating the power supply of claim 22 further comprising sensing the absolute value of the AC input voltage at output terminals of the rectifier circuit with a sense circuit.

26. The method of regulating the power supply of claim 25 wherein a voltage across the output terminals of the rectifier circuit is representative of a magnitude of the AC input voltage.

27. The method of regulating the power supply of claim 25 further comprising limiting a maximum voltage between input terminals of the switchmode power converter.

28. The method of regulating the power supply of claim 22 wherein switching off the switch coupled between the rectifier circuit and the switchmode power converter circuit comprises sensing the AC input voltage at input terminals of the switchmode power converter and wherein switching on the switch coupled between the rectifier circuit and the switchmode power converter circuit comprises sensing a voltage across the switch.

29. The method of claim 28 wherein the voltage across the switch when the switch is off is substantially equal to a difference between the absolute value of the AC input voltage and a voltage between input terminals of the switchmode power converter.

30. The method of claim 22 wherein the first and second voltage threshold values are substantially equal.

31. The method of claim 22 wherein the first voltage threshold value is greater than the second voltage threshold value.

32. The method of claim 22 further comprising driving the switch with a drive circuit when switching the switch.

* * * * *

UNITED STATES PATENT AND TRADEMARK OFFICE
CERTIFICATE OF CORRECTION

| | |
|---|---|
| PATENT NO. | : 7,489,120 B2 |
| APPLICATION NO. | : 11/485657 |
| DATED | : February 10, 2009 |
| INVENTOR(S) | : Matthews |

Page 1 of 1

It is certified that error appears in the above-identified patent and that said Letters Patent is hereby corrected as shown below:

In Claim 16, line 32, please delete "(JGBT)" and insert -- (IGBT) --.

Signed and Sealed this

Fourteenth Day of April, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,489,120 B2 | Page 1 of 1 |
| APPLICATION NO. | : 11/485657 | |
| DATED | : February 10, 2009 | |
| INVENTOR(S) | : Matthews | |

It is certified that error appears in the above-identified patent and that said Letters Patent is hereby corrected as shown below:

Column 10, in Claim 16, line 32, please delete "(JGBT)" and insert -- (IGBT) --.

This certificate supersedes the Certificate of Correction issued April 14, 2009.

Signed and Sealed this

Fifth Day of May, 2009

JOHN DOLL
*Acting Director of the United States Patent and Trademark Office*